United States Patent [19]

Tseytlin et al.

[11] Patent Number: 5,465,624
[45] Date of Patent: Nov. 14, 1995

[54] APPARATUS FOR MEASURING KINEMATIC ERRORS IN POWER TRANSMISSION MECHANISMS

[75] Inventors: Alexander S. Tseytlin, Farmington Hills; Francis J. Brasile, Lake Orion, both of Mich.

[73] Assignee: Ford Motor Company, Dearborn, Mich.

[21] Appl. No.: 116,649

[22] Filed: Sep. 7, 1993

[51] Int. Cl.⁶ .................................................. G01P 1/07
[52] U.S. Cl. ............................................. 73/653; 73/660
[58] Field of Search ............................. 73/650, 653, 655, 73/660

[56] References Cited

U.S. PATENT DOCUMENTS

| | | | |
|---|---|---|---|
| 4,551,017 | 11/1985 | Mannava et al. | 73/657 |
| 4,601,580 | 7/1986 | Hallowell | 73/657 |
| 5,144,840 | 9/1992 | Whipple, III | 73/660 |
| 5,365,787 | 11/1994 | Hernandez et al. | 73/660 |

FOREIGN PATENT DOCUMENTS

| | | |
|---|---|---|
| 1966733 | 10/1973 | U.S.S.R. . |
| 698373 | 9/1977 | U.S.S.R. . |

OTHER PUBLICATIONS

"Measurement of Gear Transmission Error Using Laser Velocimeters", Kato et al., Proceedings of the International Conference on Motion and Power Transmissions, Hiroshima, Japan, Nov. 23–26, 1991, pp. 225–229.

Product Data Information Sheet of Bruel & Kjaer, "Torsional Vibraton Meter—Type 2523", 4 pages.

Primary Examiner—Richard Chilcot
Assistant Examiner—Max Noori
Attorney, Agent, or Firm—Joseph W. Malleck; Roger L. May

[57] ABSTRACT

An apparatus for measuring kinematic errors in power transmission mechanisms with an input shaft and an output shaft. The apparatus comprises a pair of laser doppler velocimeters (LDV's) (16,34). Each generates a laser beam split into two equal-intensity parallel beams which are projected so as to strike a shaft while the shaft rotates. The shaft produces reflected beams having a frequency which is shifted from that of the incident beams, thereby producing returning beams which are heterodyne. A measuring (20,38) channel is in communication with each LDV. An attenuator (24) is in communication with one of the measuring channels (20) for decreasing the amplitude of a signal generated by the measuring channel (20). A summing and integrating amplifier (28) is connected to the attenuator, the amplifier generating a signal indicative of kinematic error in the gear mechanism.

20 Claims, 1 Drawing Sheet

APPARATUS FOR MEASURING KINEMATIC ERRORS IN POWER TRANSMISSION MECHANISMS

TECHNICAL FIELD

This invention relates to an apparatus for checking the accuracy of power transmission mechanisms, such as gear pairs. More specifically, the present invention uses a torsional vibration meter, such as a laser doppler velocimeter to measure kinematic errors in gears.

BACKGROUND ART

In gear transmission design, there is a growing demand for the seemingly opposed requirements of carrying greater loads at higher speeds, with more reliability and quietness of operation. In part, these demands may be met to some extent by improved materials, better balancing, more nearly perfect machined surfaces, and more intensive attention to a myriad of design details. Such details include stringent mathematical analysis of both the kinematic and dynamic conditions of operation.

An essential purpose of gear-tooth profiles is to transmit rotary motion from one shaft to another. In many cases, there is an additional requirement of uniform rotary motion. An almost infinite number of forms may be used as gear-tooth profiles. Although an involute profile is one of the most commonly used in conventional gear-tooth forms that are used to transmit power, occasions may arise when some other profile can be used to advantage. In all such mechanisms, even small deviations in rotational velocity can lead to poor machine performance, premature failure, and human discomfort caused by noise and vibrations in the working gears.

An ideal gear profile may be mathematically determined. Inevitably, surface deviations occur from the ideal profile. Such deviations tend to cause an excessive acceleration or deceleration of a driven gear in relation to a driving gear, which may in turn result in noise, vibration, and knocking. Such adverse effects may also be manifest in ideal gear profiles which are mounted with some degree of eccentricity.

In general, kinematic error derives from instantaneous oscillations caused by production deviations of gear members from their proper theoretical parameters. Such errors arise from an actual positioning in space in relation to where a given point on the gear profile should be if no error existed. As a kinematic process, these errors produce acceleration and deceleration or torsional vibrations of the driven output shaft of a power transmission system. Another contributing factor may be the frequency with which meshing occurs between mating teeth. In some cases, such errors could be the source of dynamic torsional effects, which manifest themselves as kinematic errors.

In the past, physical sensors have been used to measure kinematic errors of transmissions. Such sensors include encoding sensors, seismic sensors, and optical sensors. In the case of most known kinematic error measuring systems, there is a need to install sensors upon or adjacent to the gear elements to be observed. Such sensors make physical contact with the machinery under observation, require space, and may affect the error phenomenon to be observed.

Accordingly, a need has arisen for non-contacting devices which are insensitive to radial, torsional, on linear movements of transmission shafts on which sensors should be installed under observation.

At the present time, the main method of measuring kinematic accuracy is based on mounting grid optical encoders on the final shafts of transmission systems and generating cyclic electrical signals. The phase difference of the signals, which are generated at the same frequency are then observed. Such observations indicate kinematic error in the gear mechanism.

Even those measuring systems may be difficult to use because optical encoders as a rule are large and must be mounted on the shafts very precisely, perhaps with special mounting devices. Also, such encoders are sensitive to vibration and heat, besides being sensitive to runouts (i.e. small periodic displacement, or beating) of the shaft mechanism. Further, for optical encoders, the speed of shaft rotation is limited, often making it impossible to use them at working speeds to explore dynamic processes. Electronic systems based on phase-measurement principles could control gear mechanisms with integer ratios, but measurement of automotive axles, which have as rule irrational digit ratios, may still be a technological challenge to conventional approaches.

One method of measuring torsional vibration in a rotating shaft uses a laser doppler velocimeter (LDV). One such LDV is available from the Bruel & Kjaer Company (Denmark) (Model 2523). This system allows an observer to measure torsional vibration of a rotating shaft by receiving a signal indicative of the deviation of instantaneous surface velocity from an average level.

One of the co-inventors of the present invention is the author of Russian Reference No. I966733, which discloses a seismic device that contacts the machine elements under observation. One problem which was only partially solved by that approach was how to decrease the frequency of vibration of the seismic sensing unit.

Another disclosure of one of the co-inventors herein is found in Russian Reference No. 698373, which discloses an optical encoder that measures kinematic errors in chains with non-integer ratios. Again, a contacting relationship is required between the encoder and the machinery under observation.

The Proceedings of the International Conference on Motion and Power Transmissions in Hiroshima, Japan on Nov. 23–26, 1991 included a paper entitled "Measurement of Gear Transmission Error Using Laser Velocimeters", pages 225–229, which are hereby incorporated by reference. That paper discloses a gear transmission error measurement system using a laser to measure the surface speeds of objects. The system has two rotating gears having the same surface speeds. That system does not measure the angular velocities of interacting gear elements, which may rotate at different rates of angular displacement.

A new method of kinematic accuracy checking is required which would be free from such drawbacks.

SUMMARY OF THE INVENTION

The apparatus of the present invention includes first and second means for generating and processing reflected laser energy, such as torsional vibration meters or laser doppler velocimeters (LDV)s, which are aligned with the final shafts of a controlled mechanism or machine. The final shafts include an input (driving) element which engages an output (driven) element. One LDV is aligned with the driving element, and the other LDV is aligned with the driven element. Each LDV emits a laser beam to a surface of the shaft. Each LDV receives a reflected beam, which is frequency modulated in relation to an incident beam. For signal processing, each LDV connects with a sequential measuring channel or electronic processing block. Thus, the apparatus has two channels: one for the driving element, and one for the driven element. It should be noted that the driving and driven elements may or may not interact directly with each other. For example, but not by way of limitation, the invention disclosed herein contemplates an environment in which kinematic error may be measured when power is transmitted from a driving element to a driven element indirectly, such as by a belt or chain.

The input element channel connects with precision attenuator (for example, a potentiometer) which reduces the amplitude of the input channel signal. Thereafter, the attenuated signal passes to a summing amplifier. Another input of this amplifier connects directly with the output element channel.

The output of the summing amplifier emits a signal which is a function of the relative torsional velocities of the input and output shafts. That signal is the first derivative of the kinematic error of the mechanism under scrutiny.

The signal from the output of the summing amplifier is free from extraneous vibration. It contains the deviation from an average angular velocity of the mechanism's instantaneous shaft angular rotation speed. That deviation is caused by kinematic error.

To derive information which is an analog of kinematic error, the signal from the summing amplifier may be integrated with respect to time. The integrated signal represents a kinematic error function, expressed as reciprocal angular movement of the input and output shafts.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

The present invention discloses an apparatus for measuring errors in gear transmission systems, including conical and worm gears, using first and second means for generating and processing reflected laser energy, such as torsional vibration meters, or laser doppler velocimeters (LDVs). The disclosed system harnesses lasers to measure the angular velocity of objects. Gear movement is measured in the manner disclosed below, which avoids error factors which are usually attributed to the use of conventional rotary encoders.

Figure 1:
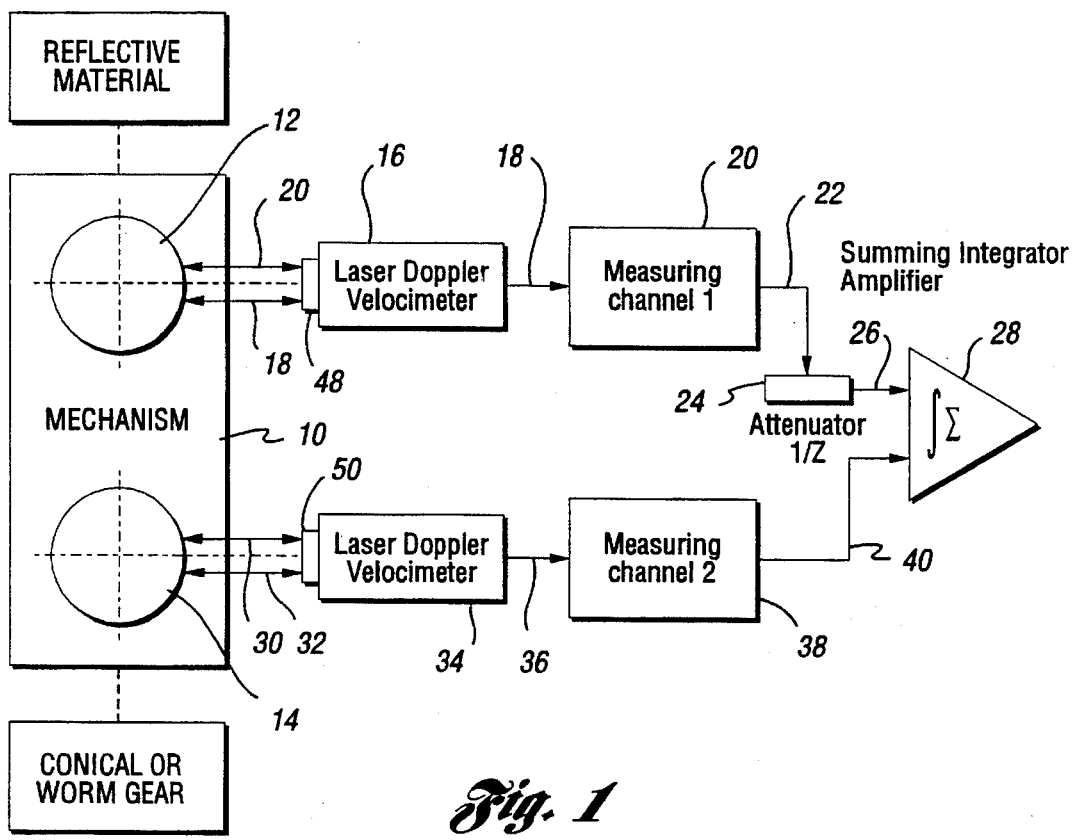
FIG. 1 is a schematic drawing of one embodiment of an apparatus for error measurement in gears according to the present invention.

As shown in FIG. 1, the disclosed system preferably uses laser optical units (LDVs) 16,34 to measure the rate of angular displacement of two revolving bodies or shafts 12,14.

The mechanism 10 includes the input and output shafts 12, 14. The laser doppler velocimeter (LDV) 16 emits a pair of laser beams 18,20 toward the surface of the input shaft 12. Reflected beams are received by the LDV 16 through sensor 48. The LDV 16 communicates a signal 18 to the measuring channel 20. In turn, the measuring channel 20 communicates a signal 22 at a relatively high amplitude to an attenuator 24, such as a potentiometer, which produces an attenuated signal 26 for processing by the summing integrating amplifier 28.

Laser beams 30,32 impinge upon the output shaft 14 which reflects beams back to the LDV 34 that in turn, produces a signal 36 for evaluation by a second measuring channel 38. As with the measuring channel 20, the measuring channel 38 quantifies deviations of instantaneous angular velocity from uniform rotation. The channel 38 then communicates a signal 40 directly to the summing integrating amplifier 28. Signal processing electronics then a display of kinematic error observed in the mechanism 10.

Preferably, the LDVs used are akin to those available from Bruel & Kjaer (e.g., Model 2523). The publication "Product Data—Torsional Vibration Meter—Type 2523 by Bruel a Kjaer, pp. 1–4, and the Instruction Manual For Torsional Vibration Meter Type 2523, pp. 25–30, are incorporated herein by reference. That product is a torsional vibration meter which can be used for general torsional vibration measurements and analysis on components having rotating parts. These include engines, motors, prime movers, pumps, compressors, couplings, shafts, and dampers. The LDV determines angular velocity and angular displacement in a non-contacting manner, together with relative torsional vibration and shaft speed measurements, if desired.

Each LDV 16,34 includes a meter and a dual-beam laser transducer. The LDV determines the instantaneous changes in angular velocity of a member under observation 12,14. By integration, each LDV measures the angular displacement of its associated rotating component from the frequency difference of retro-reflected, doppler-shifted beams.

As noted earlier, each LDV measures torsional vibrations without contacting any rotating surface. The ability to measure torsional vibrations easily and quickly simplifies mechanical design analysis.

Thus, the present invention discloses a non-contacting, portable device for the measurement of kinematic errors in various machines and mechanisms, such as automotive transmissions and axles.

At the heart of each LDV is a low power (less than 1.5 mW), Ga—Al—As laser. Each laser beam is split into two equal-intensity, parallel beams such as those depicted by the reference numerals 18,20 which strike a shaft surface. Each beam sees only the velocity resolved in a given direction, and is thus frequency-shifted.

Other components (not shown) of the LDV 16 include a mirror which directs beam 20 to a beam splitter, which also emits and receives incident laser beam 18. From the beam splitter, laser energy is directed through an aperture to a photodiode and to signal processing electronics such as the measuring channel 20. The beams 18,20,30,32 include incident laser beams and back-scattered laser energy.

Returning beams are heterodyne, yielding an output current which is modulated at a given beat frequency. That frequency is the difference between the frequencies of the doppler-shifted beams, and is directly proportional to shaft speed. The beat frequency is independent of any solid body motion of the shaft, which need not be symmetrical about its axis of rotation.

Ideally, the plane of the laser beams 18,20,30,32 is perpendicular to the associated shaft axis. If not, the beat frequency is also a function of the angle between the plane of the laser beams and a plane perpendicular to the axis of shaft rotation.

In use, each LDV requires no special alignment, calibration, or set-up procedures, and may be hand-held.

A strip of reflective tape is provided around the shaft 12,14 under evaluation. Thus, each LDV may be mounted on its tripod, or hand-held before directing beams toward the tape and generating a meter reading. If desired, the reflected band applied to the shafts 12,14 may include translucent microballoons or glass spheres to enhance reflection.

An optimum measuring distance from each LDV to the shaft is 5–50 centimeters. The maximum recommended cable length from the LDV to the measuring channel is 10 meters. Beams may be directed in a range of angles to either the side or the end of a target surface.

Manufacturing machines for cutting gears have a wide spectrum of kinematic errors which are caused by numerous gear mechanisms and transmissions contained therein. Unless detected and corrected, those errors will be transferred to the gears which are produced thereby, generating so-called "inherent errors." By applying the disclosed device for monitoring of kinematic accuracy of such machine-tools, improvements in gear quality result. In addition to the automotive industry, other areas of manufacture lend themselves to use of the disclosed method and apparatus. In the aviation field, opportunities abound to improve torsional dynamics and reduce the noise and vibration of helicopter gears and jet engine gearing. Military applications include the opportunity to improve optical/mechanical devices for artillery fire control, and submarine gearing, where noise and vibration may be critical. In the field of astronomy, it is possible to improve the gear controls of large astronomical telescopes and special parabolic reflectors, together with receiving antenna systems in radio telescopes. Returning to the automotive industry, in-vehicle applications may allow a better determination of causal factors contributing to vehicle vibration and noise.

The disclosed system can check many different machines and mechanisms in a short period of time. Sometimes the disclosed system can be used in machines without easy access to the elements of the mechanism to be observed. Its portable, noncontacting measuring capabilities enable numerous applications to small machines.

Preferably, the measuring channels 20,38 are sold by Bruel & Kjaer Company, located in Naerum, Denmark (Model No. 2523). The attenuator 24 is, for example, Model No.WB0785, also sold by Bruel & Kjaer Company. The functions of the summing integrating amplifier 28 are suitably fulfilled by the Bruel a Kjaer Company (Model No. 2635).

Figure 2:
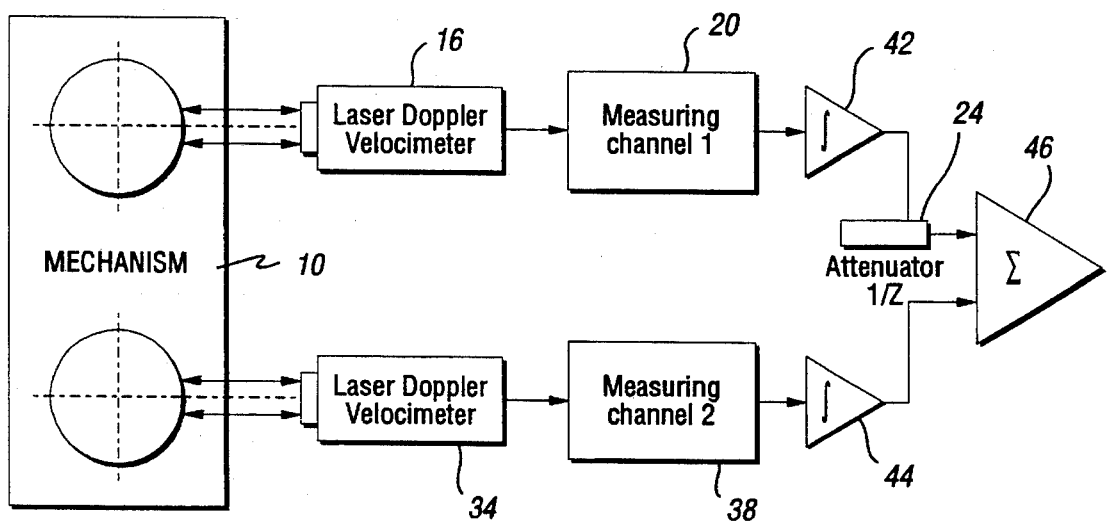
FIG. 2 is an alternate embodiment of the invention depicted in FIG. 1.

Turning now to FIG. 2, there is depicted an alternate embodiment of the apparatus shown in FIG. 1. In FIG. 2, an integrating amplifier 42 links the measuring channel 20 and attenuator 24 before a signal is passed to a summing amplifier 46. Another integrating amplifier 44 communicates between the second measuring channel 38 and the summing amplifier 46. Such an embodiment essentially performs an integration function before summation. The alternative embodiment is especially useful in exploring the combustion process and in other dynamic research applications.

In practice, in each embodiment, the summing amplifier 46 compares signals from the measuring channels 20 and 38. The integrating amplifiers 42,44 transform angular velocity errors into angular errors. Such angular error represents the kinematic error itself.

The output of the amplifiers 28,46 is a signal representing the relative angular velocities of the input shaft versus those of the output shaft. That signal is the first derivative of kinematic error, and is free from vibration components which may result from non-uniformity in drive rotation. The signal contains only the deviation from average velocity of the mechanism's shaft rotation caused by kinematic error.

While the best mode for carrying out the invention has been described in detail, those familiar with the art to which this invention relates will recognize various alternative designs and embodiments for practicing the invention as defined by the following claims.

We claim:

1. An apparatus for measuring kinematic error in power transmission mechanisms including an input shaft and an output shaft, comprising:

a first angular torsional vibration meter for use as a laser doppler angular velocimeter in optical communication with the input shaft;

a first measuring channel in communication with the first torsional vibration meter;

an attenuator in communication with the first measuring channel for signal balancing;

an amplifier in communication with the attenuator;

a second angular torsional vibration meter for use as a laser doppler angular velocimeter in optical communication with the output shaft; and a second measuring channel in communication with the second torsional vibration meter and with the amplifier;

the amplifier generating a signal indicative of the kinematic error, the apparatus being insensitive to extraneous radial or torsional motion of either shaft.

2. The apparatus of claim 1 wherein each torsional vibration meter comprises a laser doppler velocimeter (LDV).

3. The apparatus of claim 1 wherein the attenuator comprises a potentiometer.

4. The apparatus of claim 1 wherein each shaft includes a reflective material disposed thereupon, the reflective material receiving an incident laser beam and reflecting backscattered laser energy parallel thereto.

5. The apparatus of claim 1 wherein each meter is in non-contacting relationship with an associated shaft.

6. The apparatus of claim 1 wherein either shaft rotates at a speed between 30–7200 RPM.

7. The mechanism of claim 1 wherein the input shaft engages the output shaft by a conical gear.

8. The mechanism of claim 1 wherein the input shaft engages the output shaft by a worm gear.

9. An apparatus for measuring kinematic error in power transmission mechanisms including an input shaft and an output shaft, comprising:

first angular means for generating and processing reflected laser energy, the energy including a beam split into two equal intensity incident parallel beams which are projected so as to strike the input shaft, the shaft producing reflected beams having a frequency which is doppler-shifted from that of the incident beams;

a first measuring channel in communication with said first means;

an attenuator in communication with the first measuring channel for decreasing the amplitude of a signal generated by the measuring channel;

second angular means for generating and processing reflected laser energy, the laser energy including a beam split into two equal intensity incident parallel beams which are projected so as to strike the output shaft, the shaft producing reflected beams having a frequency which is doppler-shifted from that of the incident beams;

a second measuring channel in communication with said second means;

an amplifier connected to the attenuator and the second measuring channel, the amplifier generating a signal indicative of the kinematic error in the gear mechanism, the apparatus being insensitive to extraneous radial or torsional motion of either shaft.

10. The apparatus of claim 9 wherein each means for generating and processing reflected laser energy comprises a laser doppler velocimeter (LDV).

11. The apparatus of claim 9 wherein the attenuator comprises a potentiometer.

12. The apparatus of claim 9 wherein each shaft includes a reflective material disposed thereupon, the reflective material receiving an incident laser beam and reflecting back-scattered laser energy parallel thereto.

13. The apparatus of claim 9 wherein each means is in non-contacting relationship with an associated shaft.

14. The apparatus of claim 9 wherein either shaft rotates at a speed between 30–7200 RPM.

15. An apparatus for measuring kinematic error in power transmission mechanisms, including an input shaft and an output shaft, comprising:

first angular means for generating and processing reflected laser energy, the energy including a beam split into two equal intensity incident parallel beams which are projected so as to strike the input shaft, the shaft producing reflected beams having a frequency which is doppler-shifted from that of the incident beams;

a first measuring channel in communication with said first means;

an attenuator in communication with the first measuring channel for decreasing the amplitude of a signal generated by the measuring channel;

second angular means for generating and processing reflected laser energy, the laser energy including a beam split into two equal intensity incident parallel beams which are projected so as to strike the output shaft, the shaft producing reflected beams having a frequency which is doppler-shifted from that of the incident beams;

a second measuring channel in communication with said second means;

an amplifier connected to the attenuator and the second measuring channel, the amplifier generating a signal indicative of the kinematic error in the gear mechanism, the apparatus being insensitive to extraneous radial or torsional motion of either shaft;

each shaft including a reflective material disposed thereupon, the reflective material receiving an incident laser beam and reflecting back-scattered laser energy parallel thereto; and wherein the reflective material comprises translucent spheres.

16. The apparatus of claim 15 wherein the translucent spheres comprise glass balls.

17. The mechanism of claim 9 wherein the input shaft engages the output shaft by a conical gear.

18. The mechanism of claim 9 wherein the input shaft engages the output shaft by a worm gear.

19. An apparatus for measuring kinematic error in power transmission mechanisms including an input shaft and an output shaft, comprising:

first means for generating and processing reflected laser energy, the energy including a beam split into equal intensity incident parallel beams which are projected so as to strike the input shaft, the shaft producing reflected beams having a frequency which is doppler-shifted from that of the incident beams;

a first processing electronic block in communication with said first means;

a first integrating amplifier in communication with the first processing electronic block;

a potentiometer in communication with the first integrating amplifier, the potentiometer decreasing the amplitude of a signal generated by the first integrating amplifier;

second means for generating and processing reflected laser energy, the energy including a beam split into two equal intensity incident parallel beams which are projected so as to strike the output shaft, the shaft producing reflected beams having a frequency which is doppler-shifted from that of the incident beams;

a second processing electronic block in communication with said second means;

a second integrating amplifier in communication with said second processing electronic block; and a summing amplifier in communication with the potentiometer and the second integrating amplifier, the summing amplifier generating a signal indicative of kinematic error in the gear mechanism.

20. The apparatus of claim 19, wherein each means comprises a laser doppler velocimeter.

* * * * *